(12) United States Patent
Jablonski

(10) Patent No.: US 10,455,029 B2
(45) Date of Patent: Oct. 22, 2019

(54) INTERNET OF THINGS (IOT) DEVICE DISCOVERY PLATFORM

(71) Applicant: DISH Network L.L.C., Englewood, CO (US)

(72) Inventor: Jeffrey Jablonski, Aurora, CO (US)

(*) Notice: Subject to any disclaimer, the term of this patent is extended or adjusted under 35 U.S.C. 154(b) by 118 days.

(21) Appl. No.: 15/858,190

(22) Filed: Dec. 29, 2017

(65) Prior Publication Data

US 2019/0208024 A1    Jul. 4, 2019

(51) Int. Cl.

| G06F 15/173 | (2006.01) |
| H04L 29/08 | (2006.01) |
| H04L 12/24 | (2006.01) |
| H04L 29/06 | (2006.01) |
| G06Q 20/28 | (2012.01) |
| G06F 17/27 | (2006.01) |
| G06Q 20/40 | (2012.01) |
| G06Q 20/02 | (2012.01) |

(52) U.S. Cl.
CPC ............ *H04L 67/16* (2013.01); *H04L 41/22* (2013.01); *H04L 67/12* (2013.01); *H04L 69/18* (2013.01); *G06F 17/2795* (2013.01); *G06Q 20/02* (2013.01); *G06Q 20/28* (2013.01); *G06Q 20/4014* (2013.01)

(58) Field of Classification Search
CPC ......... H04L 67/12; H04L 41/12; H04L 67/10; H04L 67/125; H04L 67/02; H04L 12/2803; H04L 63/0272; H04L 12/2816; H04L 61/1511; H04L 63/0428; H04L 63/083; H04L 69/08; H04W 4/70
See application file for complete search history.

(56) References Cited

U.S. PATENT DOCUMENTS

| 2015/0279366 A1* | 10/2015 | Krestnikov ............. H04W 4/70 704/235 |
| 2016/0132553 A1* | 5/2016 | Seo ..................... G06F 16/2425 726/28 |
| 2017/0262873 A1* | 9/2017 | Atchley ............. G06Q 30/0202 |
| 2018/0182389 A1* | 6/2018 | Devaraj .................. G10L 15/22 |
| 2018/0302349 A1* | 10/2018 | Ban ......................... H04L 51/04 |
| 2019/0043496 A1* | 2/2019 | Tal ......................... G10L 15/22 |

* cited by examiner

*Primary Examiner* — Michael A Keller
*Assistant Examiner* — Thao D Duong

(57) ABSTRACT

Techniques described herein include a communication and device discovery platform though which Internet of Things (IoT) devices may discover other IoT devices, ascertain device statuses, purposes, and the functions and operations supported by other IoT devices, and collaborate with other IoT devices to request and initiate particular functions and operations. Using the platform and corresponding functionality described herein, an IoT device may announce to another nearby IoT devices its general description, availability, required permissions, as well as a listing and description of functions it may perform. Other authorized IoT devices may make use of the broadcasted functions, using artificial intelligence, natural language processing, and additional techniques that enable independent and decentralized IoT devices to discover the purposes, supported functions and operations, and invoke the functionality of other IoT devices.

20 Claims, 7 Drawing Sheets

| IoT Device Identifier | Description | Location | Auth. Required | Fee for Use? |
|---|---|---|---|---|
| LnxuCinId4 | Bob's Doorbell | <GPS Coordinates> | False | False |
| I532kCzYEM | Sue's Doorbell | <GPS Coordinates> | False | False |
| uyv8jvbjAH | City of Englewood Fire Hydrant | <GPS Coordinates> | True | False |
| Jm1MiTCF9w | Paid Parking Space | <GPS Coordinates> | False | True |
| 2CjNwmxfUW | Bob's Garage Door | <GPS Coordinates> | True | False |
| iW4VNC83ty | Traffic Light #034874 | <GPS Coordinates> | True | False |
| QEdHu1Wov | Pay For Parking Space | <GPS Coordinates> | False | True |
| hbINOdg70T | Bob's Sprinkler System | <GPS Coordinates> | True | False |
| P7Ak5Ncb41 | Dan's Awesome Honda Civic Baby! | <GPS Coordinates> | False | True |
|  |  |  |  |  |

*FIG. 5A*

| Owner Name | Device ID | Summary | Status | Fee for Use? | Usage Fee | Payment Accepted |
|---|---|---|---|---|---|---|
| MegaParkLLC | 34sdfho31 | Parking Space/Carport | Open | True | $.0175/sec | Visa, Amex, Mastercard |
| MegaParkLLC | 34sdfho32 | Parking Space/Carport | Taken until 15:30 | True | $.0175/sec | Visa, Amex, Mastercard |
| MegaParkLLC | 34sdfho33 | Parking Space/Carport | Open | True | $.0175/sec | Visa, Amex, Mastercard |
| MegaParkLLC | 34sdfho34 | Parking Space/Carport | Reserved | True | $.0175/sec | Visa, Amex, Mastercard |
| Shelly-Bo-Belly | odk23h06 | MySpace (Get it?!) | Free | True | $4.00/hr | Paypal, Bitcoin |

*FIG. 5B*

INTERNET OF THINGS (IOT) DEVICE DISCOVERY PLATFORM

TECHNICAL FIELD

The present disclosure relates to apparatuses and methods of communication and collaboration between Internet of Things (IoT) devices. In particular, the disclosure describes a communication platform though which IoT devices may discover other IoT devices, along with the functions and operations supported by those devices, and interact with one or more other IoT devices to perform collaborative tasks.

BACKGROUND

The Internet general refers to a network of interconnected computer systems, which use standard Internet protocols (e.g., the Transmission Control Protocol (TCP) and Internet Protocol (IP)), and a network worldwide network infrastructure to communicate. The Internet of Things (IoT) extends the Internet's concepts and infrastructure of interconnectedness to any physical device, so that all objects ranging from simple sensor devices, to household appliances, to vehicle systems, to industrial equipment may communicate and interact with via a suite of known communication protocols. While a number of communication standards and protocols exist to allow IoT devices to establish communication sessions with each other, it may be difficult for these devices to coordinate their interactions in order to perform collaborative tasks. Solutions such as proprietary IoT devices and specialized applications may support certain interactions and collaborative tasks, but only between those proprietary devices and/or devices upon which a specialized application is installed.

SUMMARY

Various techniques are described herein, including a communication and device discovery platform, though which Internet of Things (IoT) devices may discover other IoT devices, ascertain device statuses, purposes, and the functions and operations supported by other IoT devices, and collaborate with other IoT devices to request and initiate particular functions and operations. The IoT Device Discovery Platform (IDDP) described herein refers to a communication framework for enabling IoT devices to communicate information about what those IoT devices are and how they can be used. For example, using the IDDP and the corresponding functionality and techniques described herein, an IoT device may be queried by or proactively announce to nearby IoT devices its general description, availability, required permissions, as well as a listing and description of functions it may perform. Other listening or querying IoT devices that are authorized may make use of the broadcasted functions. Further, as discussed below, the IPPD need not be limited to any set of standard definitions of common functions and states to facilitate communication between IoT devices, but may be entirely decentralized as to the programming, installation, and setup processes for independent IoT devices. Rather than centralized and predetermined standard definitions of IoT device functions and states, independent IoT devices may use a basic agreed-upon platform for exchange of function and state data, using artificial intelligence, natural language processing, and additional techniques to enable IoT devices to discover and invoke the supported functions and operations of other IoT devices.

According to certain aspects described herein, an Internet of Things (IoT) controller device may receive natural language input identifying requested tasks to be performed using other IoT devices separate and unrelated to the IoT controller device (which may be referred to as IoT thing devices). The IoT controller device may receive data transmissions from nearby IoT thing devices, and such data transmissions may include device identifiers and natural language descriptions of the IoT thing devices and/or the functions supported by those devices. In various embodiments, IoT thing devices may periodically broadcast such transmissions wirelessly to any other nearby IoT devices, and/or may transmit such data in response to a request from a nearby IoT controller device seeking other IoT devices with which to interact. Transmissions from some IoT thing devices (e.g., either broadcasts or responses to queries from other IoT devices) may include additional information, such as the current status of the IoT device, location information (e.g., GPS coordinates of the IoT device), authorization requirements for interacting with the IoT device, etc.

According to additional aspects, after receiving communications from one or more IoT thing devices, an IoT controller device may select one or more particular IoT thing devices to perform some or all of a requested task. The IoT controller device may select the IoT thing device(s) based on comparisons of the natural language input identifying the requested task, to the natural language device descriptions and/or function/operation descriptions received from the various IoT thing devices, and/or based on additional characteristics of the IoT thing devices, such as the current statuses of the devices, prices/rates for performing certain functions, and/or the authorization credentials required by the IoT thing devices. In addition to selecting the particular IoT thing device(s), the IoT controller device may use similar techniques to discover and then select the particular functions/operations supported by those IoT thing device(s) in order to perform the requested tasks. Further, the IoT controller device may transmit instructions to the selected IoT thing devices, to perform the selected functions/operations on those devices.

According to still further aspects described herein, certain IoT thing devices and/or the particular functions/operations on those devices may have associated authorization and/or payment requirements. Thus, IoT controller and thing devices may engage in additional communications to address the authorization and/or payment requirements prior to the requested functions/operations being performed on the IoT thing devices. For example, an IoT controller device may compare and/or negotiate prices between multiple different IoT thing devices that offer similar or the same services, and then may coordinate payment with the selected IoT thing device via a third-party payment service. According to additional aspects, IoT controller devices and/or IoT thing devices may initiate communications with one or more external Internet-based systems, such as cloud-based data repository, to retrieve information about other IoT devices and/or to resolve ambiguity in the natural language data received from a counterparty IoT device. Additionally, in some cases, an IoT controller may generate and display user interfaces in order to receive user assistance regarding selections of IoT thing devices or functions, confirmation of payment terms, etc.

Further areas of applicability of the present disclosure will become apparent from the detailed description provided hereinafter. It should be understood that the detailed description and specific examples, while indicating various embodi-

BRIEF DESCRIPTION OF THE DRAWINGS

A further understanding of the nature and advantages of various embodiments may be realized by reference to the following figures in conjunction with the description of certain embodiments presented herein. However, the appended figures should not be seen as limiting or defining the present disclosure.

FIGS. 5A and 5B are two example charts containing representative data received by an Internet of Things (IoT) controller device from an IoT thing device, in accordance with certain embodiments of the present disclosure.

Figure 1A:
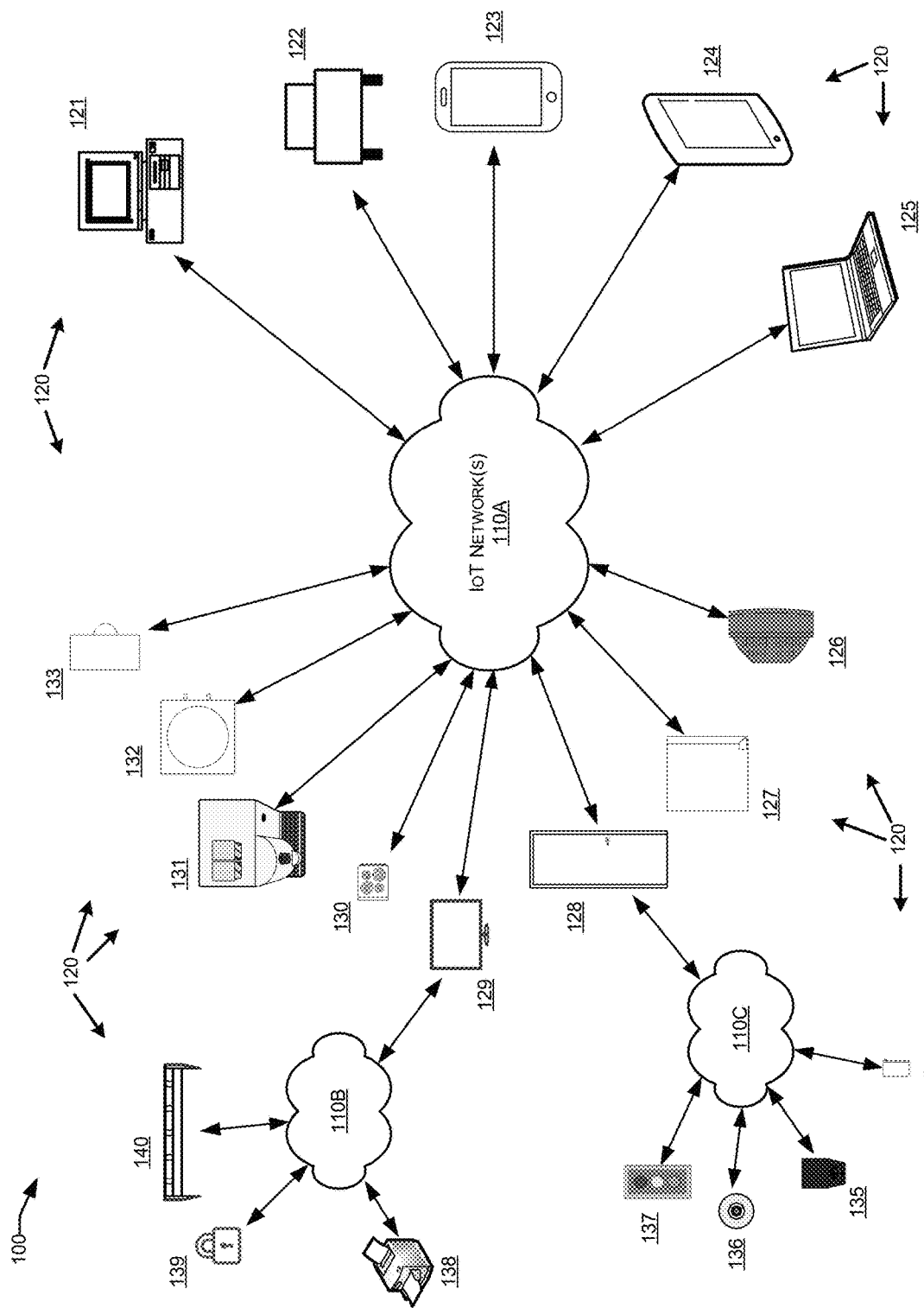
FIG. 1A is a block diagram illustrating an example of an Internet of Things (IoT) system comprising a plurality of IoT devices in communication over an IoT network, in accordance with certain embodiments of the present disclosure.

In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Various techniques (e.g., methods, systems, computer-readable storage media devices coupled to processors and storing computer executable instructions, etc.) are described herein, including a communication and device discovery platform, though which Internet of Things (IoT) devices may discover other IoT devices, ascertain device statuses, purposes, and the functions and operations supported by other IoT devices, and collaborate with other IoT devices to request and initiate particular functions and operations. The IoT Device Discovery Platform (IDDP) described herein refers to a communication framework for enabling IoT devices to communicate information about what those IoT devices are and how they can be used. For example, using the IDDP and the corresponding functionality and techniques described herein, an IoT device may be queried by or announce to another nearby IoT devices its general description, availability, required permissions, as well as a listing and description of functions it may perform. Other listening or querying IoT devices that are authorized may make use of the broadcasted functions. Further, as discussed below, the IPPD need not be limited to any set of standard definitions of common functions and states to facilitate communication between IoT devices, but may be entirely decentralized as to the programming, installation, and setup processes for independent IoT devices. Rather than centralized and predetermined standard definitions of IoT device functions and states, independent IoT devices may use a basic agreed-upon platform for exchange of function and state data, using artificial intelligence, natural language processing, and additional techniques to enable IoT devices to discover and invoke the supported functions and operations of other IoT devices.

As discussed below, in certain embodiments described herein, Internet of Things (IoT) controller devices may receive natural language input identifying requested tasks to be performed using other IoT devices separate and unrelated to the IoT controller device (which may be referred to as IoT thing devices). The IoT controller device may receive data transmissions from nearby IoT thing devices, and such data transmissions may include device identifiers and natural language descriptions of the IoT thing devices and/or the functions supported by those devices. In various embodiments, IoT thing devices may periodically broadcast such transmissions wirelessly to any other nearby IoT devices, and/or may transmit such data in response to a request from a nearby IoT controller device seeking other IoT devices with which to interact. Transmissions from some IoT thing devices (e.g., either broadcasts or responses to queries from other IoT devices) may include additional information, such as the current status of the IoT device, location information (e.g., GPS coordinates of the IoT device), authorization requirements for interacting with the IoT device, etc.

In some embodiments, after receiving communications from one or more IoT thing devices, an IoT controller device may select one or more particular IoT thing devices to perform some or all of a requested task. The IoT controller device may select the IoT thing device(s) based on comparisons of the natural language input identifying the requested task, to the natural language device descriptions and/or function/operation descriptions received from the various IoT thing devices, and/or based on additional characteristics of the IoT thing devices, such as the current statuses of the devices, prices/rates for performing certain functions, and/or the authorization credentials required by the IoT thing devices. In addition to selecting the particular IoT thing device(s), the IoT controller device may use similar techniques to discover and then select the particular functions/operations supported by those IoT thing device(s) in order to perform the requested tasks. Further, the IoT controller device may transmit instructions to the selected IoT thing devices, to perform the selected functions/operations on those devices.

In the various embodiments described below, IoT thing devices and/or the particular functions/operations on those devices may have associated authorization and/or payment requirements. Thus, IoT controller and thing devices may engage in additional communications to address the authorization and/or payment requirements prior to the requested functions/operations being performed on the IoT thing devices. For example, an IoT controller device may compare and/or negotiate prices between multiple different IoT thing devices that offer similar or the same services, and then may coordinate payment with the selected IoT thing device via a third-party payment service. According to additional aspects, IoT controller devices and/or IoT thing devices may initiate communications with one or more external Internet-based systems, such as cloud-based data repository, to retrieve information about other IoT devices and/or to resolve ambiguity in the natural language data received from a counterparty IoT device. Additionally, in some cases, an IoT controller may generate and display user interfaces in order to receive user assistance regarding selections of IoT thing devices or functions, confirmation of payment terms, etc.

As used herein, the term "Internet of Things (IoT) device" may refer to any electronic device capable of storing and transmitting and/or receiving data from other IoT devices. IoT device may include, for example, computing devices such as personal computers, laptop or tablet computers, smartphones and other mobile computing devices, vehicle-based computer systems, voice-controlled digital assistant devices, and human-wearable or human-implantable devices. Additional types of IoT devices may include any workplace or home appliance, any light or lighting system, any security or environment control or monitoring system, any industrial equipment, autonomous vehicle, service-providing robot, and/or any sensor device. By way of example only, any of the following non-exclusive list of appliances or sensor devices may be configured as IoT devices: physical environment sensors such as cameras, microphones, power usage sensors, light sensors, water sensors, temperature sensors, movement sensors, and various other sensors capable of monitoring environmental conditions, pet door/feeders, smoke/CO2 detectors, home security systems, electronic doors, security cameras, window sensors, door sensors, weather sensors, shade controllers, utility monitors, personal monitoring/health sensors (e.g., heartrate monitors, glucose monitors, sleep monitors, step/movement trackers, etc.), intercoms, fans, overlay devices, microphones, MP3 players, radios and other music output devices, speakers, display devices, modems, lights and lighting systems, thermostats, printers, scales, electronic medication dispenser, water dispensers (e.g., sinks, showers), refrigerators, freezers, tea kettles, dishwashers, water heaters, air conditioning units, doorbells, fireplaces, televisions, monitors, set-top boxes, stovetops, microwaves, electronic cooking appliances, washing machines, dryers, outdoor lights, motion sensors, sprinkler systems, garage door openers, and the like. As illustrated by these examples, even physical objects that are traditionally not electronic may be configured as IoT devices, by including circuitry and/or other physical interface components (e.g., analog circuits and/or digital or computer interfaces) to store operational status data and/or functional data, and to connect with other IoT devices.

Additionally, in various embodiments discussed herein certain IoT devices may be referred to as "IoT controller devices" or "IoT thing devices." In such embodiments, the term "IoT controller device" may refer to an IoT device that performs a device discovery process and/or a function (or operation) discovery process on another IoT device, or that initiates/requests/invokes a function (or operation) on another IoT device. The term "IoT thing device" may refer to the counterpart IoT device in these embodiments, that is, an IoT device that transmits device description data and/or function data to be discovered by an IoT controller device, or that receives requests/invocations of its functions from an IoT controller device.

Referring now to FIG. 1A, an example IoT system 100 is shown, in which a number of IoT devices 120 are configured to communicate over one or more IoT networks 110. Although twenty different IoT devices 121-140 (which may be referred to individually or collectively as IoT device(s) 120), and three separate communication networks 110a, 110b, and 110c (which may be referred to individually or collectively as IoT network(s) 110 or IoT interface (s) 110) are shown in this example, it should be understood that this architecture is illustrative only, and any number IoT devices 120 may communicate via any number of different IoT networks 110 in other embodiments.

In some embodiments, IoT network(s) 110 may correspond to peer-to-peer (P2P) networks formed among the various IoT devices 120. Such networks may be wired or wireless, and may use any combination of known network protocols and technologies, including IP-based networks (e.g., WiFi, IEEE 802.11), RF networks, Bluetooth networks, cellular networks, NFC-based communications, etc. In some examples, IoT network(s) 110 may be based on short-range wireless technologies, and thus IoT devices 120 may discover and communicate with other IoT devices 120 that are within close proximity of each other. Of course, it should be understood that long-range embodiments are also possible, and thus IoT devices 120 in direct or indirect communication might be located in different cities or different countries.

In this example, IoT devices 121-125 may correspond to multi-purpose and/or general purpose computing devices, including personal computer 121, vehicle-based computer system 122, smartphone 123, tablet computer 124, and laptop 125. Such multi-purpose and/or general purpose devices 121-125 may be equipped with user input components (e.g., keyboard, mouse, microphone, touchscreen, etc.) and corresponding software to receive and process a variety of requests from users. Additionally, IoT device 121-125 also may have IP-based network interfaces and the capability to connect to the Internet through one or more wide area network connections (e.g., cellular, WiFi, etc.). Therefore, such multi-purpose and/or general purpose devices 121-125 may correspond to IoT controller devices in many examples discussed herein. In contrast, IoT devices 126-140 in this example may correspond to various appliances, sensors, and/or simpler single-purpose electronic devices. Devices 126-140 also may or may not have Internet connectivity, and also may or may have general user input components. Accordingly, such devices 126-140 may correspond to IoT thing devices in many examples discussed herein. In some cases, IoT thing devices may be passive devices, such as simple electronic devices having RFID tags, NFC tags, simple RF or infrared functionality, etc., which are capable of storing and transmitting device information over short ranges but could not act as IoT controller devices. However, even appliances, sensor devices, and other simple single-purpose devices may act as IoT controller devices in some cases, while general purpose devices such as personal computers 121, vehicle-based systems 122, smartphones 123, tablets 124, etc., may act as IoT thing devices.

Different examples of the interactions between IoT controller devices and IoT thing devices are described in more detail below. In some examples, IoT controller devices may receive and process user requests to perform tasks that will require interactions with one or more different IoT devices (e.g., IoT thing devices), and thus IoT controller devices may perform the processes of discovering accessible IoT thing devices, determining the purpose, status, and functions capable of being performed via the accessible IoT thing devices, and then invoking the appropriate functions on selected IoT thing devices to perform the tasks requested by the user. Thus, IoT controller devices may take the active role in discovering available (e.g., nearby) IoT thing devices, learning their capabilities, and instructing them to perform a desired set of functions, while IoT thing devices may take a more passive role of receiving and responding to requests from IoT controller devices.

However, in some cases, IoT thing devices also may take active roles during IoT device interactions, and perform the functions of IoT controller devices. For example, during a device discovery process, an IoT controller device 123 may broadcast a query to all accessible IoT things devices, seeking an available printer. Although none of the IoT things devices accessible to the IoT controller 123 is a printer, each IoT thing device may be able to connect to a broader network of additional IoT thing devices that are not directly accessible to the IoT controller 123. In this example, a monitor 129 IoT thing device may perform its own device discovery process to locate a printer IoT device 138, and may relay information about the printer device 138 (e.g., a device ID, description, status, location, etc.) to the IoT controller 123.

As another example, an IoT controller device (e.g., vehicle-based system 122) may receive a request from a user to open the front door of the user's house. Through device discovery and inquiry, the IoT controller 122 may identify door 128 as the correct IoT thing device, and may transmit an open request to the door IoT thing device 128. In response, the door IoT device 128 may, based on its own internal programming, decide to turn on one or more lights and/or begin playing music in response to the door being opened. Thus, the door IoT thing device 128 may take the role of an IoT controller by discovering and then instructing one or more light IoT thing devices 136 and/or speaker IoT thing devices 136 to perform the desired functions.

Figure 1B:
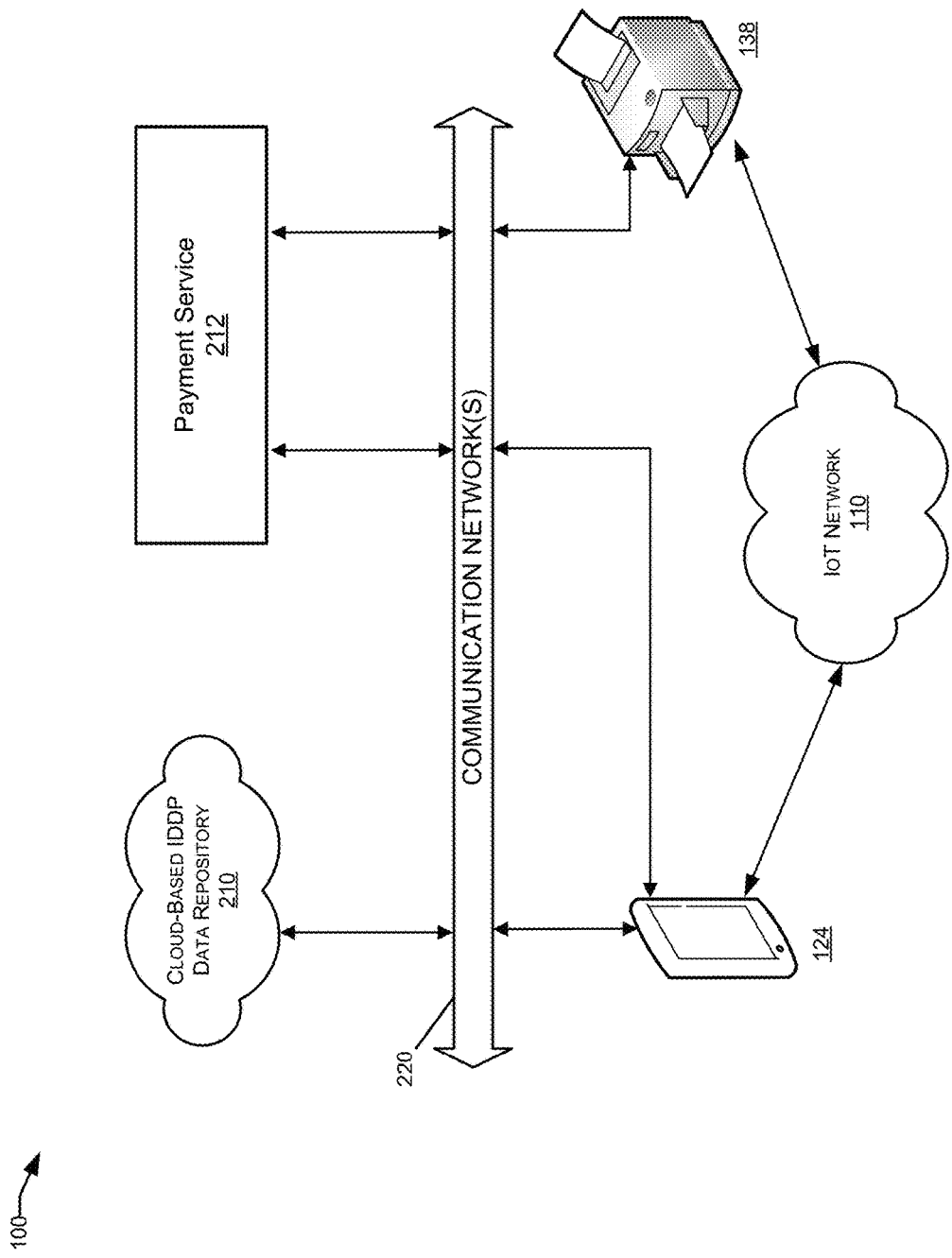
FIG. 1B is a block diagram illustrating another example of an Internet of Things (IoT) system comprising two IoT devices and additional systems in communication over an IoT network and/or other computer networks, in accordance with certain embodiments of the present disclosure.

With reference now to FIG. 1B, another view of an example IoT system 100 is shown. In this example, two particular IoT devices 120 are shown, a tablet computer IoT controller device 124, and a printer IoT thing device 138, communication over an IoT network 110. It should be understood that any of the other IoT devices 120 and other systems or network components discussed herein may still be present within IoT system 100, but are not shown in this example so as not to obscure the other elements in this figure. As described in detail in the embodiments and examples below, an IoT controller device 124 may interact with an IoT thing device 138 over the IoT network 110 to discover the existence of the IoT thing device 138, discover the general purpose, type, and description of the IoT thing device 138, and also to query the current status of the IoT thing device 138, the listing of operations/functions supported by the IoT thing device 138. Further, the IoT controller device 124 and IoT thing device 138 may interact to request operations by the IoT controller device 124 that are performed on the IoT thing device 138, including communications that support authentication and/or payment requirements for performing operations, in some embodiments.

As shown in this example, an IoT controller device 124 and/or an IoT thing device may communicate with additional systems over additional communication networks. For example, as described below in more detail, IoT controller devices and/or IoT thing devices may use third-party payment services 212 to submit/receive payment in exchange for the IoT controller device requesting operations on a IoT thing device. For instance, the IoT controller device 124 and thing device 138 may interact over the IoT network 110 to agree upon a particular third-party payment service, and an amount due for the requested usage of the IoT device. The IoT controller device 124 may access the third-party payment service 212, via a separate communication network 220 (e.g., an IP-based network) and use an account number or name provided by the IoT thing device 138 to transfer funds into a specified account. In various embodiments, IoT thing devices 138 may or may have the capability to access the third-party payment service 212 over the IP network 220 to verify that the payment was received.

Additionally, in some embodiments, IoT controller devices and/or IoT thing devices may access external data sources to provide additional relevant data relating to their interactions with other IoT devices 120 over the IoT network. For example, the IoT controller device 124 may access the cloud-based IDDP data repository 210 over the IP-network 220, in order to request/receive additional description data, feedback data, and the like regarding other IoT devices 120 within the network. Such data may include further description data to allow the IoT controller device 124 to better understand the purpose and capabilities of the IoT thing device 138, feedback data from previous IoT controller devices 124 regarding the performance of the IoT thing device 138, and/or warning data indicating that the IoT device 138 may be malfunctioning or may be compromised by a computer hacker, etc. In some embodiments, IoT thing devices also may have the capabilities to access the IDDP data repository 210 in order to retrieve further information about current or potential counterpart IoT controller devices 124.

Figure 2:
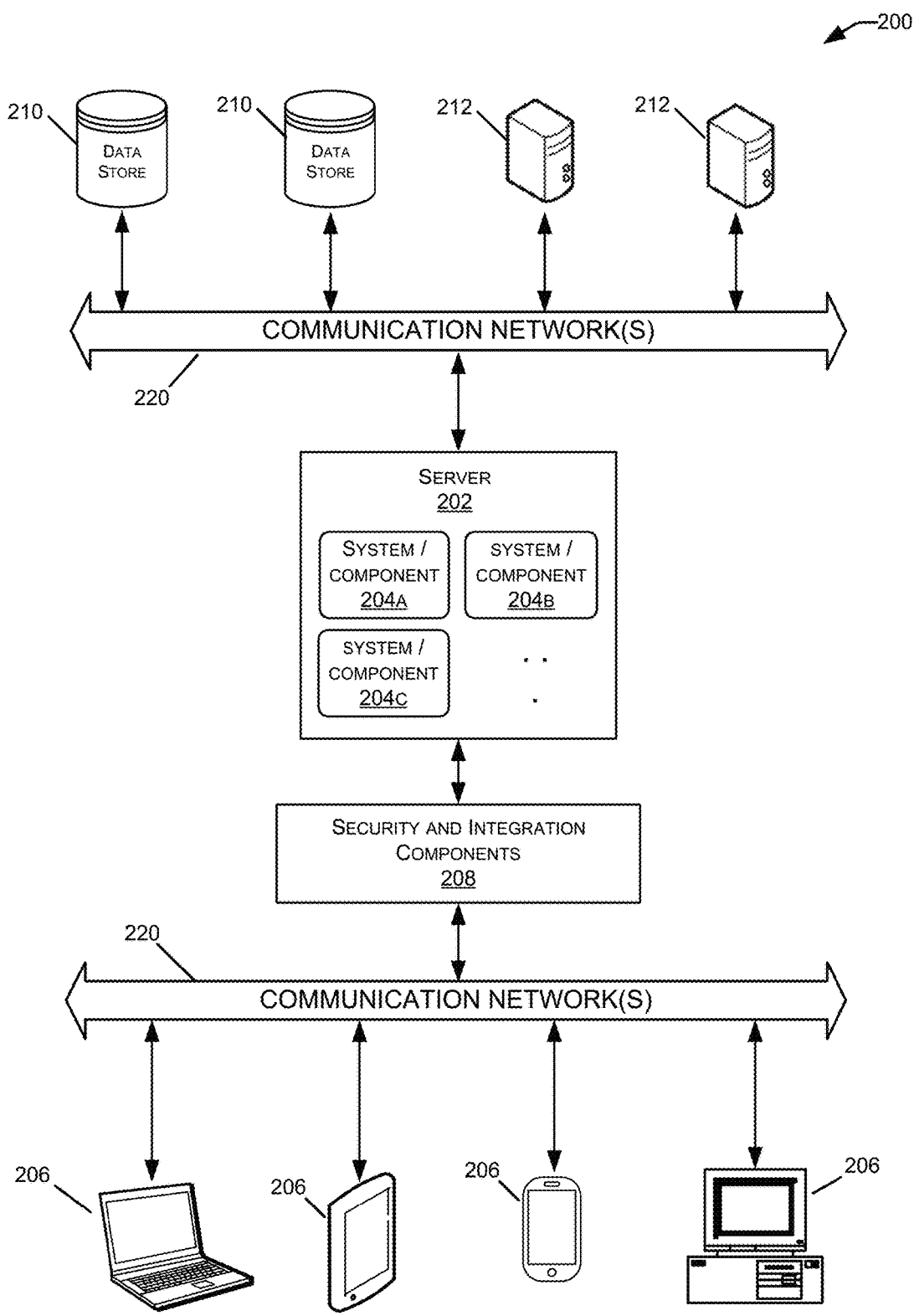
FIG. 2 is a block diagram illustrating a computer server and computing environment within a video distribution network, in accordance with certain embodiments of the present disclosure.

With reference now to FIG. 2, an illustrative distributed computing environment 200 is shown including a computer server 202, four client computing devices 206, and other components that may implement certain embodiments and features described herein. In some embodiments, the client devices 206 may correspond to any of the IoT devices 120 discussed above in FIG. 1A, which may be connectable over communication networks 220 to one or more web servers 202, cloud-based data stores, and/or other back-end resources. However, the computing environment 200 illustrated in FIG. 2 may correspond to any other combination of devices and servers configured to implement a client-server model or other distributed computing architecture.

Certain IoT devices 206 may be configured to receive and execute client applications over one or more networks 220. Such client applications may be web browser based applications and/or standalone software applications, such as mobile device applications. Server 202 may be communicatively coupled with the IoT devices 206 via one or more communication networks 220. IoT devices 206 may receive client applications from server 202 or from other application providers (e.g., public or private application stores). Server 202 may be configured to run one or more server software applications or services, for example, web-based or cloud-based services, to support content distribution and interaction with IoT devices 206. Users operating IoT devices 206 may in turn utilize one or more client applications (e.g., virtual client applications) to interact with server 202 to utilize the services provided by these components.

Various different subsystems and/or components 204 may be implemented on server 202. Users operating the IoT devices 206 may initiate one or more client applications to use services provided by these subsystems and components. The subsystems and components within the server 202 and IoT devices 206 may be implemented in hardware, firmware, software, or combinations thereof. Various different system configurations are possible in different distributed computing systems 200 and content distribution networks 100. The embodiment shown in FIG. 2 is thus one example of a distributed computing system and is not intended to be limiting.

Although exemplary computing environment 200 is shown with four IoT computing devices 206, any number of IoT computing devices, including both IoT controller devices and IoT thing devices may be supported. Other devices, such as specialized sensor devices, etc., may interact with IoT devices 206 and/or servers 202.

Figure 3:
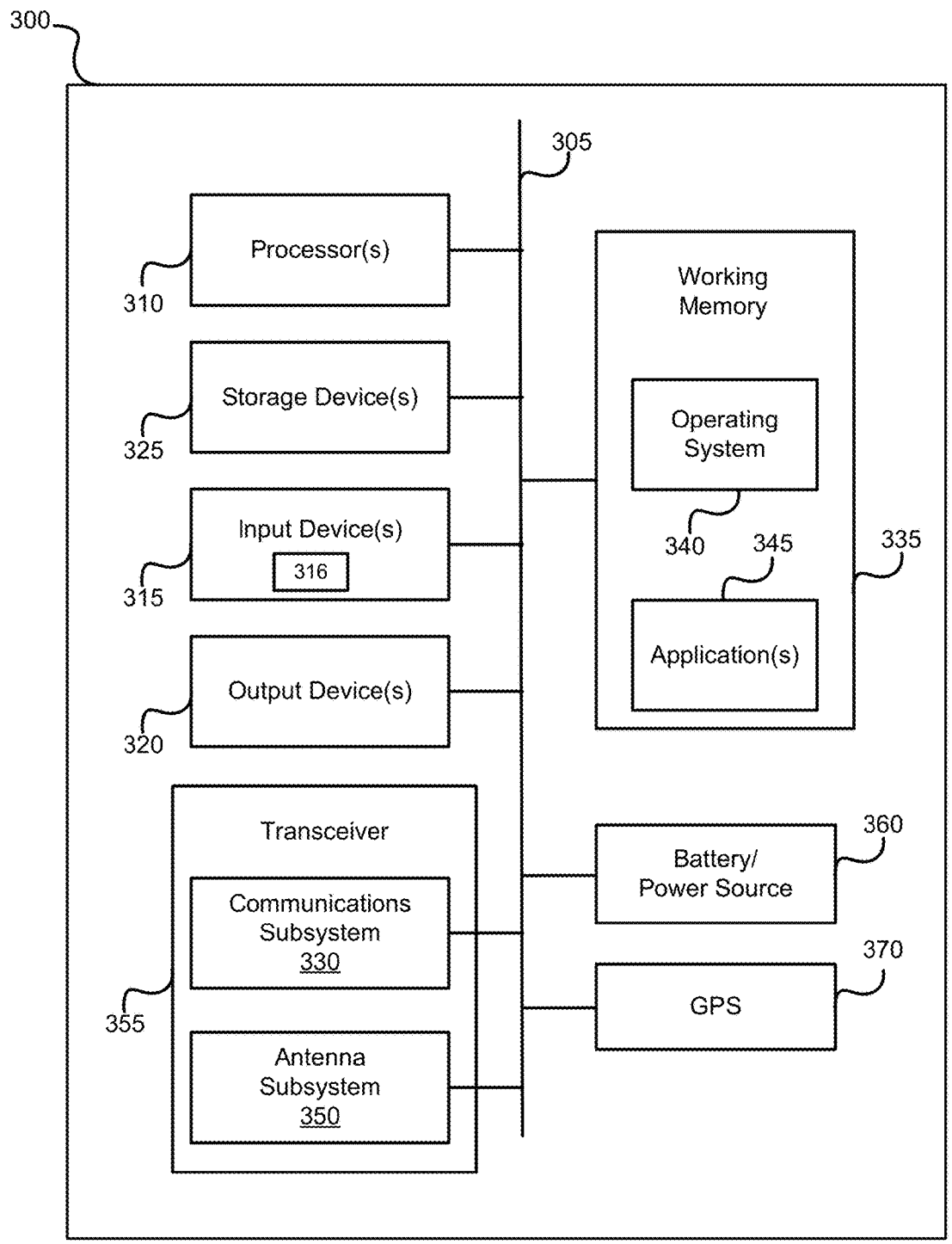
FIG. 3 is an illustration of an embodiment of a computing device that may perform the methods provided by various embodiments, in accordance with certain embodiments of the present disclosure.

Referring now to FIG. 3, an example is shown of a computing system 300 on which various aspects of the disclosure may be implemented. The computing system 300 may correspond to any of the IoT devices 120 described herein, and/or to servers such as 202 and/or other computing resources. As discussed below, IoT controller devices 300 may be configured to communicate with other IoT thing devices 300 in order to discover those thing devices 300 having various functions and purposes, to query and negotiate with the thing devices, and to request or instruct thing devices to perform various functions. In some embodiments, IoT devices 300 configured to act as IoT controller devices may be mobile computing devices, such as smartphones, tablet computers, personal digital assistants, vehicle-based devices, and/or wearable computing devices. In other embodiments, IoT controller devices 500 may be other computing devices such as desktop computers, laptop computers, tablet computers, and/or other electronic devices. In still other examples, IoT controller devices 300 and/or IoT thing devices 300 may correspond to appliances, sensors, non-general purpose electronic devices, and the like.

According to one or more aspects, a computer system 300 as illustrated in FIG. 3 may be incorporated as part of a computing device, which may implement, perform, and/or execute any and/or all of the features, methods, and/or method steps described herein. For example, computer system 300 may represent some of the components of a mobile device. The mobile device can be connected to a wireless interface and/or a network interface. Examples of mobile devices include but are not limited to video game consoles, tablets, smart phones, and human-wearable or human-embedded or electronic devices. In some embodiments, the computing system 300 may be configured to implement the features and functionality of the various IoT devices 120 described herein. FIG. 3 provides a schematic illustration of one embodiment of a computer system 300 that may perform the methods provided by various other embodiments, as described herein, and/or can function as the back-end computer server, a remote data store server and/or other computer system. FIG. 3 is meant only to provide a generalized illustration of various components, any and/or all of which may be utilized as appropriate. FIG. 3, therefore, broadly illustrates how individual system elements may be implemented in a relatively separated or relatively more integrated manner.

The computer system 300 is shown comprising hardware elements that can be electrically coupled via a bus 305 (or may otherwise be in communication, as appropriate). In one embodiment, the bus 305 can be used for the processor 310 to communicate between cores and/or with the memory 335. The hardware elements may include one or more processors 310, including without limitation one or more general-purpose processors and/or one or more special-purpose processors (such as digital signal processing chips, graphics acceleration processors, and/or the like); one or more input devices 315, and one or more output devices 320.

The computer system 300 may further include (and/or be in communication with) one or more non-transitory storage devices 325, which can comprise, without limitation, local and/or network accessible storage, and/or can include, without limitation, memory devices, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

The computer system 300 might also include a communications subsystem 330, which can include without limitation a modem, a network card (wireless or wired), an infrared communication device, a wireless communication device and/or chipset (such as a Bluetooth® device, an 802.11 device, a WiFi device, a WiMax device, cellular communication facilities, etc.), and/or the like. According to one embodiment of the present invention, a receiver and GNSS receiver may be examples of a communication subsystem 330. The communications subsystem 330 may permit data to be exchanged with one or more communication networks (such as the networks described herein), other computer systems, and/or any other devices described herein. In many embodiments, the computer system 300 may further comprise a non-transitory working memory 335, which can include a RAM or ROM device, as described above.

When computing system 300 corresponds to a mobile client device, the communications subsystem 330 may be linked to an antenna subsystem 350 which may comprise a single antenna, multiple antennas or an antenna array. Antenna subsystem may be used to communicate wirelessly—e.g. according to signaling for GSM, WCDMA, LTE, CDMA2000 and/or WiFi IEEE 802.11—with entities such as other IoT devices 120 and/or back-end servers 202, etc. Such wireless communication may enable reception of obfuscated locations and other information by a preferred mobile device 300. According to some embodiments, communication subsystem 330 and antenna subsystem 350 can be used as a transceiver 355 to communicate wirelessly (e.g., receive/transmit data).

In some embodiments, the power source 360 of the computer system 300 may be a battery (e.g., for mobile IoT devices 120). Additionally or alternatively, the power source 360 may AC power (e.g., 420V, 240V, and/or 250V) and/or DC power (e.g., power from a USB cable and/or a battery or batteries), depending on the type and characteristics of the IoT device 300. In some embodiments, power source 316 may be a battery that can be recharged wirelessly, for example when the battery is within range or a wireless recharging component. In some embodiments, a battery compartment associated with the battery 360 may holds one or more batteries as a power source for the device 300 (e.g., AAA, AA, C, D, button cell, lithium, etc.). In some embodiments, the device 300 may further comprise one or more solar panels to completely or partially power the device 300.

The computer system 300 also may comprise software elements, shown as being currently located within the working memory 335, including an operating system 340, device drivers, executable libraries, and/or other code, such as one or more application programs 345, which may comprise computer programs provided by various embodiments, and/or may be designed to implement methods, and/or configure systems, provided by other embodiments, as described herein. Merely by way of example, one or more procedures described with respect to the method(s) discussed in relation to the following process flow diagrams might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 325 described above. In some cases, the storage medium might be incorporated within a computer system, such as computer system 300. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 300 and/or might take the form of source and/or installable code, which, upon compilation and/or installation on the computer system 300 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Some embodiments may employ a computer system (such as the computer system 300) to perform methods in accordance with the disclosure. For example, some or all of the procedures of the described methods may be performed by the computer system 300 in response to processor 310 executing one or more sequences of one or more instructions (which might be incorporated into the operating system 340 and/or other code, such as an application program 345) contained in the working memory 335. Such instructions may be read into the working memory 335 from another computer-readable medium, such as one or more of the storage device(s) 325. Merely by way of example, execution of the sequences of instructions contained in the working memory 335 might cause the processor(s) 310 to perform one or more procedures of the methods described herein, for example one or more of the elements of the method described with respect to the process flow diagrams below.

As noted above, computer system 300 may correspond to an IoT controller devices 300 configured to discover and interact with other IoT devices 120. Such IoT controller devices 300 may include laptop computers, smartphones, tablet computers, and other various types of mobile devices, each of which may include some or all of the hardware, software, and networking components discussed above. Specifically, a mobile IoT device 300 may be any computing device with sufficient memory for storing device data (e.g., device descriptions, device status, device functions/operations, etc.), and sufficient processing and I/O subcomponents for interacting with other IoT devices. Accordingly, mobile IoT devices 300 may include the necessary hardware and software components to establish the network interfaces, security and authentication capabilities, etc. Laptop computers, tablet computers, smart phones, smart watches, wearable computing devices, and vehicle-based computing systems are all examples of mobile IoT devices 300 that may operate as IoT controller devices.

For computing devices 300, the input subsystems 315 and output subsystems 320 may include the I/O hardware and software components to support a specific set of output capabilities (e.g., LCD display screen characteristics, screen size, color display, video driver, speakers, audio driver, graphics processor and drivers, etc.), and a specific set of input capabilities (e.g., keyboard, mouse, touchscreen, voice control, cameras, facial recognition, gesture recognition, etc.). Output devices 320 may include one or more display subsystems, indicator lights, or non-visual displays such as audio output devices, etc. Display subsystems may include, for example, cathode ray tube (CRT) displays, flat-panel devices, such as those using a liquid crystal display (LCD) or plasma display, light-emitting diode (LED) displays, projection devices, touch screens, and the like. In general, use of the term "output device" is intended to include all possible types of devices and mechanisms for outputting information from computer system 300 to a user or other computer. For example, output devices 320 may include, without limitation, a variety of display devices that visually convey text, graphics and audio/video information such as monitors, printers, speakers, headphones, automotive navigation systems, plotters, voice output devices, and modems. It should be understood that different computing devices 300 may support different input and output capabilities within their I/O subsystems 315-320, and may be compatible or incompatible with different user inputs and/or with other devices 300.

Additionally, the input devices/systems 315 of certain computing devices 300 may include one or more device sensors 316 configured to detect context data associated with specific IoT devices 300. Context data may include any data describing the current (and/or previous) state of the device 300, the physical environment of the device 300, and/or the user of the mobile device 300, at various times during interactions with other IoT controller. For example, such context data may include the location of the device 300 and any detected movement of the device 300 during interactions with other IoT devices 120, including speed and overall distance traveled, as well as jiggling and vibrating movements indicative of walking, jogging, running, or traveling in cars, busses, or trains, etc. Accordingly, sensors 316 may include accelerometers, speedometers, compasses, gyroscopes, and/or digital positioning systems such as Global Position Satellite (GPS) receivers 370, in order to detect the position and movement of the device 300 at various times. Additional context data may include the orientation of the device 300, ambient light, noise and/or visual background data detected by the device 300, and temperature and lighting data within the physical environment of the device 300 during an IoT interaction. Thus, sensors 316 also may include thermometers, barometers, light sensors, cameras, microphones, heat sensors, motion sensors, and the like, in order to detect background noises such as traffic, music, conversations, and other potential distractions (e.g., other people nearby, animals, etc.), as well as lighting and temperature factors that may affect the resources provided by the device 300 and/or the interactions with other IoT devices 120 and users.

Figure 4:
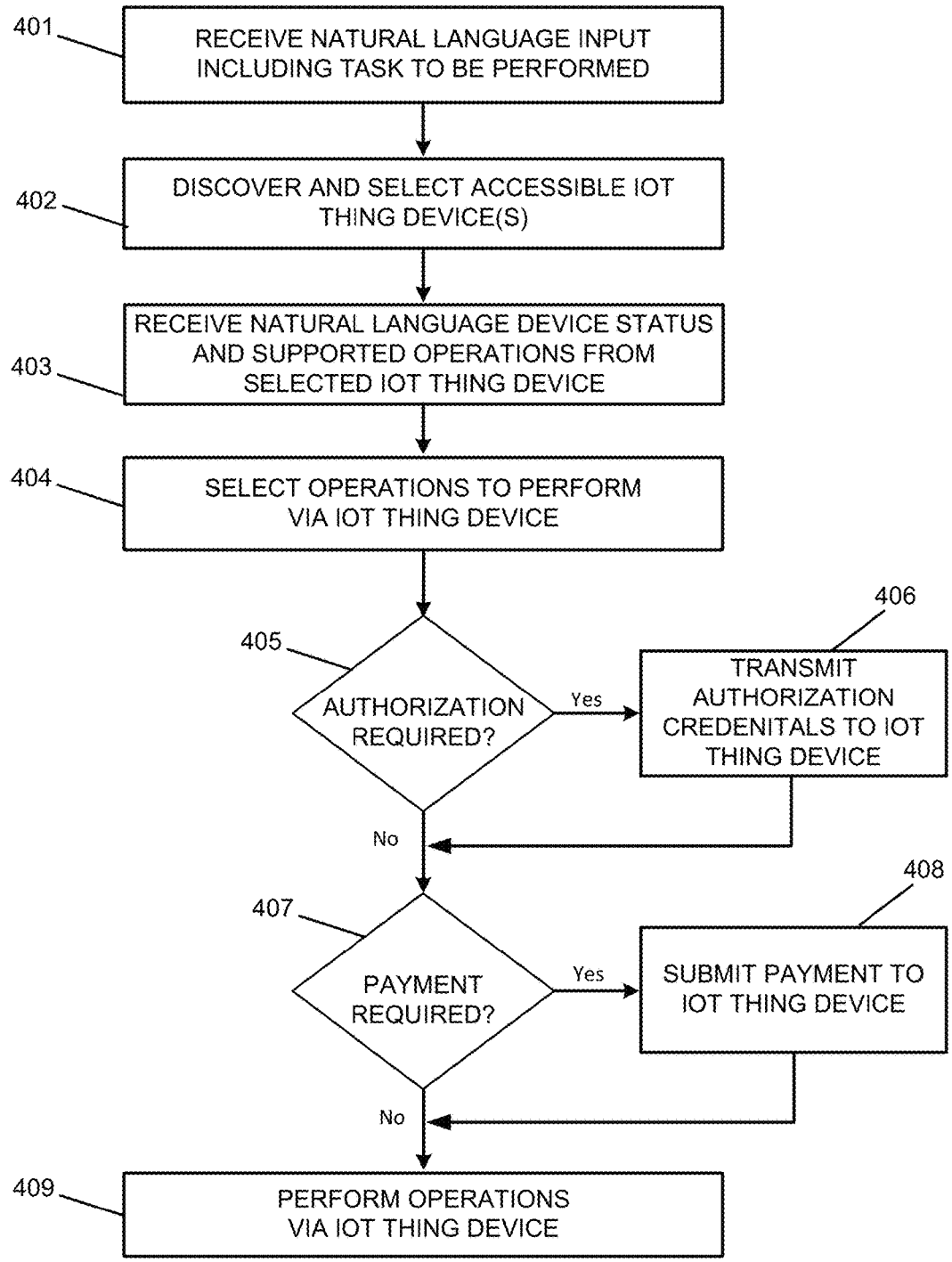
FIG. 4 is a flow diagram illustrating an example process by which an Internet of Things (IoT) controller device may discover and interact with additional IoT devices, in accordance with certain embodiments of the present disclosure.

Referring now to FIG. 4, a flow diagram is shown illustrating an example process of performing tasks by an IoT controller device, by discovering and interacting with one or more additional IoT devices. Thus, in some embodiments, the steps 401-409 in this example may be performed by any of the IoT devices 120 discussed above (which is referred to an IoT controller device), in communication with one or more additional IoT devices 120 discussed above (which are referred to as IoT thing devices).

In step 401, the IoT controller device may receive natural language input identifying a task to be performed by the IoT controller device in collaboration with one or more additional IoT thing devices. As discussed above, the IoT controller device may correspond to a general-purpose computer device, such as a personal computer 121, vehicle-based device 122, smartphone 123, tablet computer 124, or laptop 125, having user input components (e.g., keyboard, mouse, touchscreen, microphone and voice recognition, etc.) that allow the controller device to receive requests/instructions from users. In some examples, IoT thing devices may be simpler electronic devices, such as appliances, sensors, and non-general purpose computing devices that need not have user input components. However, IoT thing devices also may comprise complex general purpose computing devices such as 121-125 in other examples.

The natural language input received in step 401 may correspond to a request from a user to perform a task, such as a spoken or typed instruction, or an instruction provided by the user via a user interface displayed on the IoT controller device 120. The request may instruct the IoT controller device 120 to perform some task involving interaction with one or more IoT thing devices 120 in the vicinity of the IoT controller device. By way of example only, a user may request a smartphone IoT controller device 122 to perform any of the following:
a) "Find parking spaces near me."
b) "Purchase the Oreos from the vending machine in front of me."
c) "Find a car nearby to pick me up."
d) "Turn on my favorite show on the screen in front of me."
e) "I'm cold, turn on the heat in this room."
f) "Become the remote for this toy drone I just bought."
As illustrated by each of these examples, the request received in step 401 may be a request that cannot be completed by the user's smartphone 122 alone, but may require interaction with one or more additional IoT thing devices 120, such as (a) a parking space monitor/sensor device, (b) a vending machine, (c) a car share vehicle (d) a display screen, (e) a heating system, and (f) a toy drone electronic device.

In some cases, the request received may be received in step 401 immediately after that request was spoken, typed, or otherwise input by the user into the IoT control device 120. However, in other cases, the request in step 401 may have been previously input by the user, for example, as part of the user's setup or configuration settings for a home monitoring system or IoT device management system. For instance, a particular user may configure their smartphone IoT controller 122 to automatically request that their electronic front door IoT thing device 128 be locked whenever they leave the house, or that their electronic garage door opener IoT thing device be opened whenever they drive up to their house unless the garage is currently full.

Regardless of whether the request is an ad hoc user request such as requests (a)-(f) above, or a rule-based request previously programmed/configured into an IoT controller device 120, the request may be received in step 401 as natural language input, such as the user's spoken words, written text, etc. As discussed below in more detail, this provides several technical advantages and efficiencies, in that all IoT devices 120, whether controllers or thing devices, may be programmed and configured independently by their respective owners and operators without requiring any advanced coordination between devices. Rather, IoT devices 120 may communicate via natural language processing with other IoT devices 120 to discover the presence and location of other devices, as well as the device purposes, status, and the operations supported by other IoT devices. There need be no requirement that interacting IoT devices 120 have the same manufacture, run the same operating system or device-controller software, or communicate using the same language or terminology.

In step 402, the IoT controller device 120 may discover one or more accessible IoT thing devices, and may select a particular IoT thing device (or multiple IoT thing devices) that can be used to perform the requested task received in step 401. In some cases, the accessible IoT thing devices may correspond to the set of nearby IoT-compatible devices 120 that are within direct communication range of the IoT controller device, e.g., using a short-range wireless IoT network 110. To perform the IoT device discovery and selection process in step 402, the IoT controller device 120 may initially transmit a query message asking any IoT-compatible device within range to reply with its unique device identifier and a natural language description of the purpose of the device. Alternatively or additionally, individual IoT thing devices 120 may periodically broadcast out their unique device identifiers and their natural language descriptions to all devices within range. In either case, the IoT controller device 120 may receive and collect transmissions from several IoT thing devices in step 402. In some embodiments, each of these transmissions may include at least a unique device identifier and a general device description, and also may include additional device information such as the current location of the IoT thing device (e.g., in GPS coordinates), the current status of the IoT thing device, the operations/functions supported by the IoT thing device, whether or not the IoT thing device requires authorization to use, and/or whether or not the IoT thing device requires a fee to use.

After receiving the transmissions from one or more IoT thing devices, the IoT controller device in step 402 may compare the natural language text from the request received in step 401, to the natural language descriptions of the IoT thing devices in step 402, to identify one or more nearby IoT thing devices that may be capable of performing the requested task. In order to select an IoT thing device in step 402, the IoT controller may execute one or more text processing and matching algorithms on the natural language text requested in step 401 and the device descriptions received in step 402. For example, the IoT controller device 120 may execute a multi-step text comparison algorithm, beginning with a first step in which the natural language text received in steps 401 and 402 are parsed into individual phrases or words, stemmed, and then compared to identify word matches between the requested task (step 401) and device descriptions (step 402). Then, if no word matches have been identified, the IoT controller device 120 may perform additional processing steps, such as performing a synonym analysis on all meaningful terms in the text strings (e.g., excluding small linking words, prepositions, articles, etc.), and then comparing the different synonym lists. Alternatively or additionally, if no word matches have been identified, the IoT controller device 120 may attempt to identify and translate foreign words and phrases into English, and then compare the translated terms to look for matches. Then, if no word matches still have been identified, the IoT controller may perform additional processing tasks, such as querying the functions of particular IoT thing devices and using the natural language function descriptions to update the natural device description, so that the overall type or purpose of the IoT thing device might be better understood based on its functions.

In some cases, a natural language processing and comparison algorithm executed by the IoT controller device 120, which may include any of the above processing techniques (e.g., word matching, stemming, synonym matching, translation, etc.) performed in any order or combination, may nonetheless by unsuccessful in selecting any IoT thing devices to perform the task requested by the user. Such failures to match task requests to IoT thing devices 120 may be caused by unusually worded user requests and/or unusual device descriptions assigned to IoT thing devices. For example, if the owner/operator of an IoT-compatible vending machine 120 configures the device name/description as "Juan's Scrumptious Snack Shack," then an IoT controller 120 may or may not be successful in using word matching, stemming, synonym matching, translating, etc., to match this IoT thing device to the user's request to "Please buy some Oreo's from this vending machine." Similarly, if the user request states, "Get me those Ding Dongs," then the IoT controller 120 may or may not be successful in using word matching, stemming, synonym matching, translating, etc., to match this unclear task request to an IoT thing device having the clear description of "food vending machine."

In such examples, when the IoT controller device 120 cannot immediately match a natural language task request to a natural language device description (e.g., with a confidence level greater than a predetermined threshold), then the IoT controller device 120 may perform one or more additional analyses, and/or may request assistance from additional data sources, to attempt to match the task description to an IoT thing device. For example, if the IoT controller device 120 cannot initially match a task request to an IoT thing device, then the controller 120 may access the Internet and perform web searches on the words/phrases within the requested task and/or with the IoT thing device description. The search results then may be analyzed, parsed, and stemmed, after which additional word comparisons and/or synonym comparisons may be performed. Additionally or alternatively, the IoT controller device 120 may contact one or more external resources, such as other IoT thing devices and/or a cloud-based IDDP data repository that is configured to store additional device description data. For example, a data entry within the IDDP repository may identify the IoT thing device mentioned above, named "Juan's Scrumptious Snack Shack," as a "vending machine," and thus the IoT controller device 120 may query the data repository using the IoT thing device identifier and/or name to receive this additional information to clarify the purpose or description of the particular IoT thing device. Further, the IoT controller 120 may generate and present a user interface in some cases, to request assistance from the user in selecting an IoT thing device. For instance, for the example user request, "I'm cold, turn on the heat in this room," if the IoT controller device 120 is unable to identify the appropriate IoT thing device to perform the task, it may select the most likely candidates and present the device names of those devices to the user via a user interface. The user may then select the appropriate device to perform the task via the user interface displayed on the IoT controller.

Referring briefly to FIG. 5A, an example table is shown illustrating a set of data that may be received by an IoT controller device 120 from multiple nearby IoT thing devices in step 402. In this example, each transmission from an IoT thing device includes a unique device identifier, a device description, a device location, and indications of whether or not authorization and/or payment are required to use the IoT thing device. In this example, if the user request received in step 401 is "Find me a car share to rent for the next few hours," the natural language matching algorithm techniques described above may be used to evaluate the IoT thing device descriptions and to select "Dan's Awesome Honda Civic Baby!" as the matching IoT thing. In other example, if the user request received in step 401 is "Ring the Doorbell," the natural language matching algorithm may detect two possible matches, and may present a user interface on the IoT controller device 120 to ask the user to clarify whether "Bob's Doorbell" or "Sue's Doorbell" is to be rung. Finally, if the user request received in step 401 is "Find parking spaces near me," the natural language matching algorithm may identify and select both the "Paid Parking Space" monitoring/sensor IoT thing device and the "Pay For Parking Space" monitoring/sensor IoT thing device as IoT thing devices capable of performing the requested task. As discussed below in more detail, the IoT controller device 120 need not select one particular parking space (or other IoT thing device) during this step, but may select all IoT thing devices 120 capable of performing the requested task, so that these multiple devices may be queried, compared, and negotiated with before the IoT controller device 120 selects the particular thing device to perform the task.

Further, as discussed above, certain IoT thing devices 120 may assist in the device discovery process in step 402 in some embodiments. For example, if the IoT controller 120 cannot identify an IoT thing device within its direct transmission range to perform a requested task, then the IoT controller may request that each of these IoT thing devices retrieve and compile a list of additional IoT thing devices within their own respective IoT networks 110, and forward that list to the IoT controller thereby expanding the network of devices that are available to the IoT controller.

In step 403, the IoT controller device 120 may receive additional natural language data from each of the IoT thing devices selected in step 402, corresponding to the device status, operations or functions supported by the device, and/or addition device information. As discussed above, in some cases an IoT controller device 120 may identify a single IoT thing device in step 402 that is capable of performing the requested task. For example, when the user requests, "Lock my front door," there is likely to be only one possible IoT thing device capable of executing that task, that is, the electronic door device 128 installed at the user's front door. In this example, in order to perform the requested task, the IoT controller device 120 may initiate a device-to-device communication session with the electronic door 128, rather than relying on broadcast transmissions to and from multiple IoT thing devices in step 402. For example, the IoT controller device 120 may query the electronic door device 128 for its current status, and may receive a natural language reply such as "Open," "Closed," "Shut," "Locked," "Deadbolted Shut," "Unlocked," "Opened a Crack," or the like.

The controller device 120 may then query the electronic door device 128 for all of its supported operations (or functions), and may receiving a listing of operations, for example, "Open; Close; Slam; Crack; Handle Lock; Handle Unlock; Deadbolt Lock; Deadbolt Unlock." Then, in step 404, the IoT controller 120 may select which of these operations to perform, based on the comparison of the natural language operation/function names (and/or accompanying operation descriptions, if present), and based on the current status of the IoT thing device. For instance, if a status query reveals that the electronic door device 128 is already in the "Locked" state, then the IoT controller 120 may determine that no function is to be performed in step 404. However, if the status query reveals that the electronic door device 128 is "Open," "Opened a Crack," or the like, then the IoT controller 120 might select the sequence of operations "Close" followed by "Deadbolt Lock" and/or "Handle Lock" to complete the requested task. The selection of the particular functions to be invoked on the IoT thing device in step 404 may be performed using similar natural language processing, logical rules, and/or artificial intelligence techniques described above in step 402. For instance, the words/phrases of the requested natural language task may be compared to the natural language action and/or operation names and descriptions of the IoT thing device(s), using techniques such as parsing and stemming words and phrases, word matching analysis, synonym matching analysis, language translation, Internet-based searching, accessing an IDDP repository, and/or presenting UIs to request assistance from the user of the controller device. These natural language matching techniques, along with a set of underlying logical rules and/or artificial intelligence techniques may be used in step 404 to select an operation or a sequence of operations that may effectively perform the task requested in step 401.

In other examples, an IoT controller device 120 may identify multiple possible IoT thing devices in step 402 that may be capable of performing the requested task, rather than only a single IoT thing device as in the above example. For example, if the user requests, "Find a nearby parking space," then in step 402, the IoT controller may identify multiple possible parking space sensor/monitor IoT thing devices in the vicinity. In such examples, the IoT controller 120 request, receive, and evaluate information such as the current device status and the supported operations from each of the identified IoT thing devices. In some embodiments, the IoT controller device 120 also may request, receive, and evaluate additional information in step 403 to better select between the different possible IoT thing devices capable of performing the requested task. For instance, if multiple parking spaces are identified in step 402 in response to the user's request for a nearby parking space, then in the step 403 the IoT controller may retrieve and evaluate the current status of each parking space, the location of each space, the authorization credentials required (if any) to use the space, and/or the fees (if any) associated with the space. The IoT controller 120 may retrieve the information by establishing different device-to-device communication sessions with each of the IoT thing devices identified in step 402. Then, in step 404, the IoT controller device 120 may use based on any combination of the additional IoT thing data received in step 403, to select the particular IoT thing device to perform the requested task, and the particular operation or sequence of operations that the select IoT thing may use to perform the task. In various embodiments, the IoT controller device 120 may use logical rules and/or artificial intelligence, along with the natural language processing techniques discussed above, to select the particular IoT thing device. An IoT controller device 120 may preconfigured sets of ordered rules associated with different tasks, in which an appropriate thing device is selected based the status of the device, the location of the device, the supported functions of the device, the price of the device, and/or the payment methods accepted by the device. An IoT controller device 120 may have a preprogrammed set of rules based on any parameters/thresholds for any of the above device variables and/or any combination of parameters/thresholds for different variables.

For example, referring briefly to FIG. 5B, another example table is shown illustrating additional data that may be received in step 403 by an IoT controller device 120, from five separate nearby IoT thing devices. In this example, the IoT thing devices may correspond to electronic sensors, monitors, and scheduling devices associated with parking spaces, and thus these devices may be the devices identified in step 402 in response to the user's request to "Find a nearby parking spot." As shown in this example, the user (and the IoT controller device) is currently nearby five spots: four owned and operated by MegaPark LLC, and one privately owned by someone calling herself "Shelly-Bo-Belly." Using the data in the table, the IoT controller device 120 may execute a set of parking spot selection rules (which may be default rules and/or particular rules selected by the user), to choose between the available parking spots. A few (non-limiting) examples of parking spot selection rules may include, for instance: select the least expensive available parking spot; select the closest available parking spot; select the closest available parking spot that is less than $5.00/hour; select the closest available parking spot that accepts the user's preferred payment method; etc. Additional logic rules and/or artificial intelligence-based rules may be applied to determine if and when to seek confirmation from the user of the IoT controller device 120. For instance, a confirmation rule for parking may specify that the IoT controller device 120 should automatically pay for the requested parking spot (i.e., without any express confirmation from the user), unless the cost of the parking spot exceeds $10/hour, in which case user confirmation must be requested and received via a confirmation user interface screen before submitting payment for the requested parking spot. Another example confirmation rule for parking spots may specify that the IoT controller device 120 should automatically pay for the requested parking spot, unless the parking spot is more than 0.25 miles away from the current location, in which case user confirmation must be requested and received via a confirmation user interface screen before submitting payment. Such rules for task that may be performed using IoT thing devices 120 within the IoT network 100, include related user notification rules that define when the user of the IoT controller is to be notified, may be stored in the IoT controller device 120, and/or in a separate storage location (e.g., an IDDP cloud-based data repository). Furthermore, different sets of rules may be established for any combinations of different tasks, different users, and/or different controller devices 120.

As these examples once again illustrate, the present techniques provide advantages in that each individual IoT controller device 120 and each individual IoT thing device may be operated, programmed, setup, and configured entirely independently. The IoT devices need not have the same manufacturer or software installation setup in order to interact, nor do the IoT devices need to use the same standards or terminology for defining requested tasks, describing devices or functions, etc. For instance, as the tables in FIGS. 5A and 5B illustrate, different IoT thing devices that perform the same tasks and operations may be setup differently using different terminology, but may nonetheless be equally discoverable and useable by an IoT controller device 120.

Returning now to FIG. 4, after the IoT controller device 120 has discovered and selected the particular IoT thing device(s) in step 402, and the particular operations to be invoked on those devices in step 404, the IoT controller device 120 may interact with the selected IoT thing device(s) in steps 405-409 to perform the requested task. As noted above, in some embodiments, certain IoT thing devices and/or certain specific operations of those IoT thing devices, may require the valid credentials of an authorized user before permitting the requested operations to be performed. Thus, in step 405, if the IoT controller 120 receives data from the IoT thing device indicating that authorization credentials are request for the requested operations (405: Yes) (e.g., via the "Auth. Required" data shown in FIG. 5A), then in step 406 the IoT controller device 120 may transmit the required credentials to the IoT thing device.

In various embodiments, authorization credentials associated with the user and/or with the IoT controller device 120 may be transmitted directly to the IoT thing device in step 406, or to a separate authorization server/component. The authorization credentials associated with user and/or with an IoT controller may be stored within the controller device (e.g., a user's personal computer 121, vehicle computer 122, smartphone 123, etc.), and thus may be transmitted as needed to any IoT thing devices such that the authorization process may be entirely transparent to the user of the IoT controller. Alternatively, the IoT controller may be configured to prompt the user to manually enter credentials and/or to provide biometric data (e.g., fingerprint, voiceprint recognition, etc.) in step 406, which then may be transmitted to the IoT thing device requiring the authorization. In some cases, the user authorization process may be performed by a third-party systems (e.g., Internet-based authorization servers) rather than by the IoT thing device. For instance, an IoT controller device 120 may authenticate over an IP-network to a third-party authorization server, which may transmit an authorization code back to the IoT controller device 120 which then may be provided to the IoT thing device in step 406. Additionally or alternatively, the third-party authorization server may transmit the authorization code and/or a confirmation of the successful authorization by the IoT controller, directly to the IoT thing device. These embodiments may provide certain advantages, for example, providing simple IoT devices (e.g., sensors, appliances, non-general purpose computing devices, etc.) the ability to enforce user-specific and/or device-specific permissions, without requiring those IoT thing devices to implement the necessary hardware and software infrastructure to perform their own authorization processes.

Additionally, in some embodiments, certain IoT thing devices may charge fees to perform certain operations. Such fees may be fixed fees or variable fees which may be based on some combination of the requesting user, requesting IoT device, current time, duration of usage, date, location, and/or the current level of demand (e.g., requests) for the IoT thing device, as well as other possible fee factors. In some cases, the price charged by an IoT thing device may be negotiable, whereby the IoT thing may support an operation request from an IoT controller that includes proposed price from the IoT controller, and/or may implement a bidding or auction process by which multiple IoT controller devices 120 may submit bids during a specified period of time for the same operations to be provided by the IoT thing device. Accordingly, in step 407, if the IoT controller device 120 receives data from the IoT thing device indicating that there is a fee associated with the requested operations (407: Yes) (e.g., based on the "Fee for Use" data shown in FIG. 5B), then in step 408 the IoT controller device 120 may submit the required usage fee.

In some examples, when payments are required to perform operations on an IoT thing device, the IoT controller device 120 may submit payment directly to the IoT thing device via an IoT network 110. For example, the IoT controller may directly transmit the required amount of digital currency, or valid financial account information (e.g., credit card number, debit account number, etc.) along with the required user information or credentials, to the IoT thing device. However, in other examples, the IoT controller device 120 may submit payment via a third-party payment service. For instance, the IoT controller and thing devices may communicate in step 408 to agree upon a particular third-party payment service and on the amount due for the requested device usage, and the IoT thing device may provide a recipient account number and/or user name. The IoT controller then may access the payment service (e.g., via a separate IP-network interface) and use the account number and/or user name to fund the account specified by the IoT thing device. Depending on the capabilities and the configuration of the IoT thing device, the IoT also may potentially access the third-party payment service to verify that the payment was received before performing the requested operations for the IoT controller.

Finally, in step 409, the IoT thing device may perform the requested operations for the IoT controller device 120. As discussed above, the types of operations that may be performed in step 409 are too many to name, and potentially may include any function supported by any electronic device. Non-limiting examples of such operations may include turning on/off a light or an appliance, opening/closing a door or window, configuring a sensor device, dispensing an item from a vending machine, printing a document, rendering content on a nearby display, playing music from a nearby speaker, reserving a parking space or car-share vehicle for some duration of time, and so on. In some embodiments, any errors encountered by the IoT thing device while performing the requested operations may be reported back to the IoT controller device 120 and/or to a separate data store (e.g., a cloud-based IDDP data repository 210), and if necessary, a return payment may be refunded from the IoT thing device to the IoT controller device 120.

Figure 6:
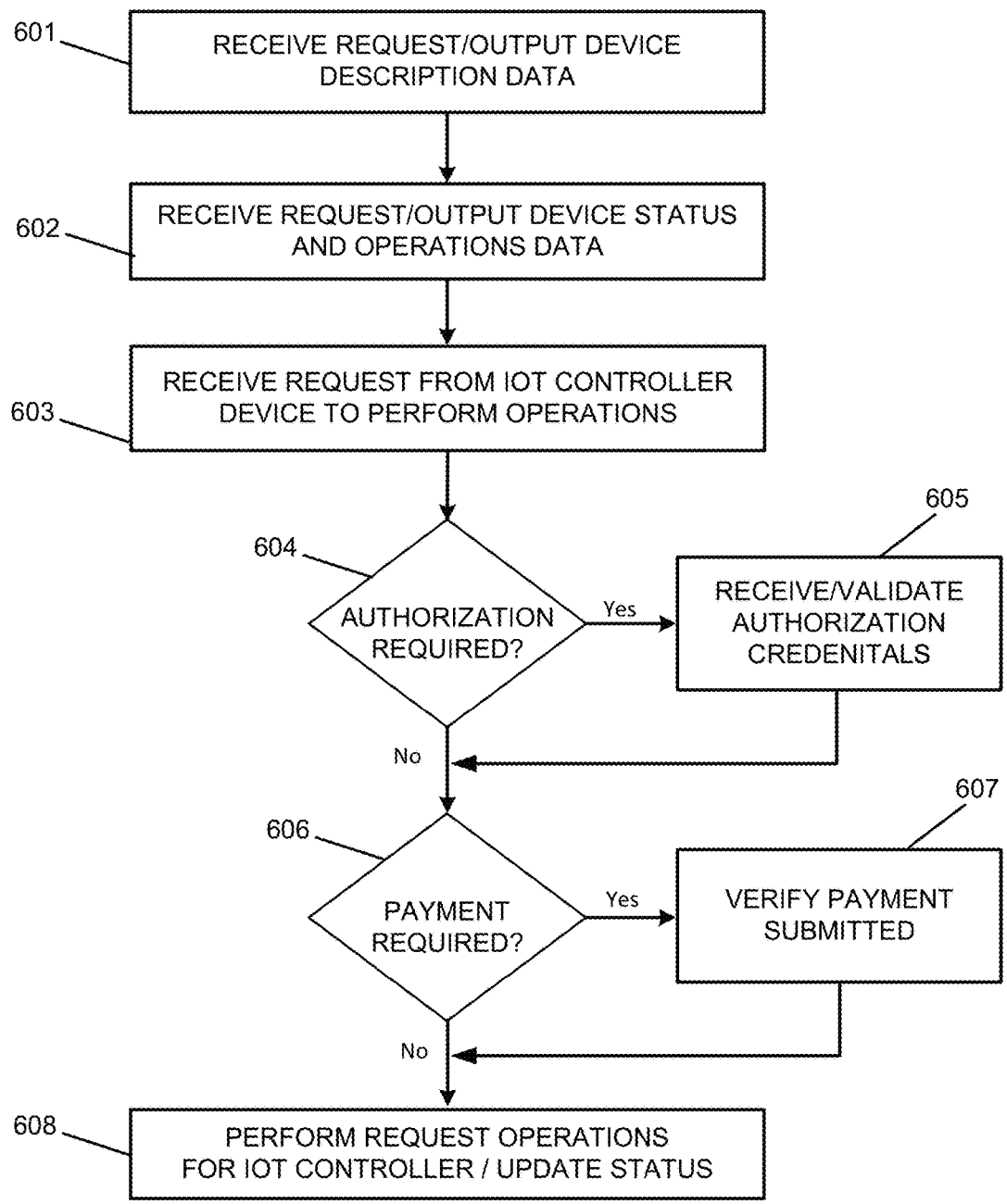
FIG. 6 is another flow diagram illustrating an example process by which an Internet of Things (IoT) thing device may interact with an IoT controller device, in accordance with certain embodiments of the present disclosure.

Referring now to FIG. 6, another flow diagram is shown illustrating an example process performed by an IoT thing device, following a device discovery process by and interactions with an IoT controller device. Thus, the steps 601-608 in this example may correspond to steps 401-409, but may represent the interactions from the perspective of an IoT thing device 120 rather than an IoT controller. As noted above, both IoT thing devices and IoT controller device may be any of the IoT devices 120 discussed above, and the distinction may depend only on the role of each device and functions performed during the device discovery process and interaction processes.

In step 601, an IoT thing device 120 may receive a device discovery request from an IoT controller device. The IoT device interactions performed in step 601 and the associated functionality may be similar or identical to the corresponding step 402 for the IoT controller device, discussed above. For instance, in response to the request from the IoT controller device, the IoT thing device 120 may transmit back to the IoT controller device a communication including a unique device identifier and a natural language description of the IoT thing device 120. Further, in some cases, IoT thing devices 120 may periodically broadcast out transmission including their device identifiers and natural language descriptions, over the IoT network 110 to any and all devices capable of receiving the transmission.

In step 602, the IoT thing device 120 may receive a device-to-device request (e.g., identifying the unique device identifier of the IoT thing device 120) from the IoT controller device for additional information about the IoT thing device 120, such as the current device status, device location, supported operations/functions, authorization and fee requirements. The IoT device interactions performed in step 602 and the associated functionality may be similar or identical to the corresponding step 403 for the IoT controller device, discussed above. Then, in step 603, the IoT thing device 120 may receive a request from the IoT controller device to perform an operation or a sequence of operations that may effectively perform a task that the IoT controller seeks to perform. The IoT device interactions performed in step 603 and the associated functionality may be similar or identical to the corresponding step 404 for the IoT controller device, discussed above.

In steps 604-608, the IoT thing device 120 and IoT controller device interact to perform the requested operation or sequence of operations on the IoT thing device. In step 604, the IoT thing device 120 may determine whether or not the requested operation(s) require valid authorization credentials from the IoT controller device. If so (604: Yes), then in step 605 the IoT thing device 120 may request, receive, and evaluate authorization credentials from the IoT controller device, using similar or identical techniques to those described above in step 405-406. If the credentials provided by the IoT controller are invalid, or are valid but do not correspond to the permissions level required to perform the requested operations, then the IoT thing device 120 may deny the request in step 605 and exit the process.

In step 606, the IoT thing device 120 may determine whether or not the requested operation(s) require payment from the IoT controller device. If so (606: Yes), then in step 607 the IoT thing device 120 may request, receive, and confirm payment from the IoT controller device, using similar or identical techniques to those described above in step 407-408. As discussed above, payment may be provided directly over the IoT network to the IoT thing device 120, or may be provided indirectly, for example, using a third-party payment service 212. In some embodiments, the IoT thing device 120 may wait until receiving confirmation of the payment (e.g., from either the IoT controller or the payment service 212), before performing the requested operations. Finally, in step 608, the IoT thing device 120 may perform the requested operation or sequence of operations, corresponding to the task that the IoT controller device seeks to perform.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims. In some embodiments, the entirety of one or more programs of interest may be recorded, and highlights within each program may be marked so that the user may directly skip to one highlight at a time.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. An Internet of Things (IoT) controller device, comprising:
 a processing unit comprising one or more processors; and
 memory comprising one or more computer-readable storage media coupled to the processing unit, the storage media storing therein computer executable instructions, which, when executed by the processing unit, causes the IoT controller device to:
  receive, via a first user input component of the IoT controller device, a natural language input identifying a requested task to be performed using one or more devices separate from the IoT controller device;
  receive, from each of a plurality of IoT thing devices, a communication including a device identifier and a natural language description of the IoT thing device;
  select a first IoT thing device from the plurality of IoT thing devices to perform at least a portion of the requested task based on a comparison of the natural language input identifying the requested task to the natural language description received from the first IoT thing device;

receive, from the first IoT thing device, via the one or more network interfaces, a natural language listing of each of a plurality of operations supported by the first IoT thing device;

select a first operation from the plurality of operations supported by the first IoT thing device based on a comparison of the natural language input identifying the requested task to the natural language listing of the operations supported by the first IoT thing device;

receive, from the first IoT thing device, payment data and authentication data associated with performance of the first operation by the first IoT thing device, the payment data comprising a payment recipient identifier;

transmit an instruction to the first IoT thing device, via the one or more network interfaces, to initiate the first operation using the first IoT thing device; and send, in association with transmitting the instruction, a prerequisite payment in accordance with the payment data and a prerequisite authentication in accordance with the authentication data.

2. The Internet of Things (IoT) controller device of claim 1, wherein comparing the natural language input identifying the requested task to the natural language description received from the first IoT thing device comprises:

(a) performing at least one of a word match analysis and a synonym match analysis between the natural language input identifying the requested task, and the natural language description received from the first IoT thing device; and (b) in response to the at least one of the word match analysis or the synonym match analysis being unsuccessful, determining whether the first IoT thing device is capable of performing the requested task, by performing at least one of:

(i) transmitting a request to the first IoT thing device for the natural language listing of the operations supported by the first IoT thing device, and determining based on the natural language listing of the operations whether the first IoT thing device is capable of performing the requested task;

(ii) transmitting a request to a cloud-based data repository identifying the first IoT thing device, and receiving a response indicating whether the first IoT thing device is capable of performing the requested task; or (iii) displaying, via a user interface on the IoT controller device, the natural language description received from the first IoT thing device, and receiving a response via the user input component indicating whether the first IoT thing device is capable of performing the requested task.

3. The Internet of Things (IoT) controller device of claim 1, the storage media storing therein further computer executable instructions, which, when executed by the processing unit, causes the IoT controller device to:

prior to transmitting the instruction to the first IoT thing device to initiate the first operation:

transmit a request to a cloud-based data repository identifying the first IoT thing device; and receive a response from the cloud-based data repository including operation history data for the first IoT thing device.

4. The Internet of Things (IoT) controller device of claim 1, the storage media storing therein further computer executable instructions, which, when executed by the processing unit, causes the IoT controller device to:

send the prerequisite payment via a third-party payment service, using the payment recipient identifier, in the amount of a price, wherein the payment data identifies the third-party payment service and the price; and send the prerequisite authentication via an authentication method identified by the authentication data and associated with the initiation of the first operation by the IoT thing device.

5. The Internet of Things (IoT) controller device of claim 4, wherein sending the prerequisite payment for the initiation of the first operation comprises:

comparing the price received from the first IoT thing device for initiation of the first operation, to a predetermined price threshold stored at the IoT controller device; and in response to a determination that the received price is not greater than the predetermined price threshold, sending the prerequisite payment for the initiation of the first operation, without receiving an express user authorization specific to the payment from a user of the IoT controller device.

6. The Internet of Things (IoT) controller device of claim 4, wherein sending the prerequisite payment for the initiation of the first operation comprises:

comparing the price received from the first IoT thing device for initiation of the first operation, to a predetermined price threshold stored at the IoT controller device; and in response to a determination that the received price is greater than the predetermined price threshold, requesting authorization for the payment via a user interface on the IoT controller device, and receiving via the user interface express user authorization specific to the payment.

7. The Internet of Things (IoT) controller device of claim 1, wherein selecting the first IoT thing device to perform at least a portion of the requested task comprises:

determining that two or more of the plurality of IoT thing devices, including the first IoT thing device, are capable of performing the requested task;

receiving, from each of the two or more IoT thing devices, payment data associated with the requested task; and selecting the first IoT thing device to perform the requested task based on the payment data received from the two or more IoT thing devices.

8. The Internet of Things (IoT) controller device of claim 1, the storage media storing therein further computer executable instructions, which, when executed by the processing unit, causes the IoT controller device to:

receive location coordinate data from each of the plurality of IoT thing devices in proximity to the IoT controller device, wherein the location coordinate data is transmitted from each particular IoT thing device in the communication including the device identifier and the natural language description of the particular IoT thing device.

9. The Internet of Things (IoT) controller device of claim 1, the storage media storing therein further computer executable instructions, which, when executed by the processing unit, causes the IoT controller device to:

receive current status data from each of the plurality of IoT thing devices in proximity to the IoT controller device, wherein the current status data is transmitted from each particular IoT thing device in the communication including the device identifier and the natural language description of the particular IoT thing device, wherein the selection of the first IoT thing device to perform at least a portion of the requested task is based on the current status data received from the first IoT thing device.

10. The Internet of Things (IoT) controller device of claim 1, the storage media storing therein further computer executable instructions, which, when executed by the processing unit, causes the IoT controller device to:
in response to selecting the first IoT thing device to perform at least a portion of the requested task, transmit a request to the first IoT thing for the operations supported by the first IoT thing device; and
receive the natural language listing of the plurality of operations supported by the first IoT thing device, from the first IoT thing device via a second communication after the selection of the first IoT thing device to perform at least a portion of the requested task.

11. A method of performing requested tasks by an IoT controller device, using one or more devices separate from the IoT controller device, the method comprising:
receiving, by an IoT controller device, a natural language input identifying a requested task to be performed using one or more devices separate from the IoT controller device;
receiving, by the IoT controller device from each of a plurality of IoT thing devices, a communication including a device identifier and a natural language description of the IoT thing device;
selecting, by the IoT controller device, a first IoT thing device from the plurality of IoT thing devices to perform at least a portion of the requested task based on a comparison of the natural language input identifying the requested task to the natural language description received from the first IoT thing device;
receiving, by the IoT controller device, from the first IoT thing device, a natural language listing of each of a plurality of operations supported by the first IoT thing device;
select, by the IoT controller device, a first operation from the plurality of operations supported by the first IoT thing device based on a comparison of the natural language input identifying the requested task to the natural language listing of the operations supported by the first IoT thing device;
receiving, by the IoT controller device, from the first IoT thing device, payment data and authentication data associated with performance of the first operation by the first IoT thing device, the payment data comprising a payment recipient identifier;
transmitting, by the IoT controller device, an instruction to the first IoT thing device to initiate the first operation using the first IoT thing device; and
sending, in association with the transmitting, a prerequisite payment in accordance with the payment data and a prerequisite authentication in accordance with the authentication data.

12. The method of claim 11, wherein comparing the natural language input identifying the requested task to the natural language description received from the first IoT thing device comprises:
(a) performing at least one of a word match analysis and a synonym match analysis between the natural language input identifying the requested task, and the natural language description received from the first IoT thing device; and (b) in response to the at least one of the word match analysis or the synonym match analysis being unsuccessful, determining whether the first IoT thing device is capable of performing the requested task, by performing at least one of:
(i) transmitting a request to the first IoT thing device for the natural language listing of the operations supported by the first IoT thing device, and determining based on the natural language listing of the operations whether the first IoT thing device is capable of performing the requested task;
(ii) transmitting a request to a cloud-based data repository identifying the first IoT thing device, and receiving a response indicating whether the first IoT thing device is capable of performing the requested task; or
(iii) displaying, via a user interface on the IoT controller device, the natural language description received from the first IoT thing device, and receiving a response via the user input component indicating whether the first IoT thing device is capable of performing the requested task.

13. The method of claim 11, further comprising:
prior to transmitting the instruction to the first IoT thing device to initiate the first operation:
transmitting a request to a cloud-based data repository identifying the first IoT thing device; and
receiving a response from the cloud-based data repository including operation history data for the first IoT thing device.

14. The method of claim 11, wherein:
the payment data identifies a third-party payment service and a price; and
sending the prerequisite payment is via the third-party payment service, using the payment recipient identifier, in the amount of the price.

15. The method of claim 14, wherein sending the prerequisite payment for the initiation of the first operation comprises:
comparing the price received from the first IoT thing device for initiation of the first operation, to a predetermined price threshold stored at the IoT controller device; and
in response to a determination that the received price is not greater than the predetermined price threshold, sending the prerequisite payment for the initiation of the first operation, without receiving an express user authorization specific to the payment from a user of the IoT controller device.

16. The method of claim 14, wherein sending the prerequisite payment for the initiation of the first operation comprises:
comparing the price received from the first IoT thing device for initiation of the first operation, to a predetermined price threshold stored at the IoT controller device; and
in response to a determination that the received price is greater than the predetermined price threshold, requesting authorization for the payment via a user interface on the IoT controller device, and receiving via the user interface express user authorization specific to the payment.

17. The method of claim 11, wherein selecting the first IoT thing device to perform at least a portion of the requested task comprises:

determining that two or more of the plurality of IoT thing devices, including the first IoT thing device, are capable of performing the requested task;

receiving, from each of the two or more IoT thing devices, payment data associated with the requested task; and selecting the first IoT thing device to perform the requested task based on the payment data received from the two or more IoT thing devices.

18. The method of claim 11, further comprising:

receiving location coordinate data from each of the plurality of IoT thing devices in proximity to the IoT controller device, wherein the location coordinate data is transmitted from each particular IoT thing device in the communication including the device identifier and the natural language description of the particular IoT thing device.

19. The method of claim 11, further comprising:

receiving current status data from each of the plurality of IoT thing devices in proximity to the IoT controller device, wherein the current status data is transmitted from each particular IoT thing device in the communication including the device identifier and the natural language description of the particular IoT thing device, wherein the selection of the first IoT thing device to perform at least a portion of the requested task is based on the current status data received from the first IoT thing device.

20. The method of claim 11, further comprising:

in response to selecting the first IoT thing device to perform at least a portion of the requested task, transmitting a request to the first IoT thing for the operations supported by the first IoT thing device; and receiving the natural language listing of the plurality of operations supported by the first IoT thing device, from the first IoT thing device via a second communication after the selection of the first IoT thing device to perform at least a portion of the requested task.

* * * * *